United States Patent

Munro et al.

[11] 4,171,336
[45] Oct. 16, 1979

[54] BALLING PROCESS

[75] Inventors: Neil Munro, High Leigh nr. Knutsford; Peter E. Wellstead, Hyde; George A. Carter, Stokesley; Mark Cross, Marton-in-Cleveland, all of England

[73] Assignee: British Steel Corporation, Great Britain

[21] Appl. No.: 876,496

[22] Filed: Feb. 9, 1978

Related U.S. Application Data

[63] Continuation of Ser. No. 691,785, Jun. 1, 1976, abandoned.

[51] Int. Cl.² .............................................. B01J 2/12
[52] U.S. Cl. ....................................... 264/37; 264/117
[58] Field of Search ................ 264/37, 117, 40.4, 40.7

[56] References Cited

U.S. PATENT DOCUMENTS

| | | | |
|---|---|---|---|
| 3,433,859 | 3/1969 | Ban | 264/37 |
| 3,651,179 | 3/1972 | Shea et al. | 264/117 |
| 3,969,103 | 7/1976 | Capes et al. | 264/117 |

Primary Examiner—Robert F. White
Assistant Examiner—James R. Hall
Attorney, Agent, or Firm—Bacon & Thomas

[57] ABSTRACT

In a continuous balling process, which may be the formation of green balls from iron ore, water and a binder in a balling drum as a stage in the pelletizing of iron ore, which includes a balling circuit in which undersized balls are recycled directly together with further raw material, the phenomenon known as surging is reduced by a method which involves including in the process a stage modifying the fundamental direct relationship between discharged undersize balls and those recharged, this unmodified direct relationship being the recurrence of the discharged balls identically as recharged balls after a constant time interval.

11 Claims, 5 Drawing Figures

BALLING PROCESS

This is a continuation, of application Ser. No. 691,785, filed June 1, 1976 now abandoned.

This invention relates to a balling process. It is especially suitable for the control of a balling process producing green balls from finely crushed iron ore and water.

Balling is a process which can be applied to the pelletizing of iron ore to form a product suitable as a blast furnace feed material. In a typical pelletizing plant an ore or a mixture of ores is dried and then ground to the required fineness. A very small proportion of a binding additive (e.g. bentonite) is added to improve its adhesion properties. A finely controlled amount of water is added. The product, now referred to as concentrate, is then charged to several balling drums into which a further small proportion of water is sprayed. In each rotating balling drum the damp material agglomerates to form green balls. The product of each drum is screened: undersize and crushed oversize green balls are recycled, while the acceptable product is charged to a moving grate on which the green balls are dried and preheated before being fired to form the required pellets.

A balling drum rotates about its longitudinal axis which is slightly inclined to the horizontal. The higher end is the charge end, the lower end the discharge end. A conveyor is provided to return the undersize green balls from the discharge end to the charge end.

The mechanism of balling is complex but two significant stages in green ball growth are the initial formation of small porous stable balls known as seeds and a subsequent growth phase in which balls grow by taking up either raw concentrate or the material of smaller balls.

In the balling process new concentrate at a constant rate and returned undersized green balls are supplied to the charge end of the balling drum. In the first few meters of the drum the existing balls grow and new seeds are formed from the concentrate. In the remainder of the drum the larger balls grow at the expense of the smaller ones. At the discharge end a new distribution of green balls emerges of which the undersized are recycled to the charge end and pass through the drum again.

We have performed a theoretical analysis on the balling drum circuit and have found that the balling process is essentially a non-linear feedback system, with non-linear components due to the drum and the screens, and an effective linear consisting of the net loop time delay. Such loops are a feature in control systems analysis and, depending upon the nature of the loop components, the system may exhibit a periodic non-linear, limit cycle, oscillation. This behaviour is continuously observed in practice on balling circuits and is known colloquially as 'surging' i.e. a self-sustaining oscillation in product size distribution. If a large number of undersized green balls are discharged and returned to the charge end of the drum they will act as seeds; and during their next pass through the drum they will reduce the number of new seeds formed by initially taking up more of the available raw material and subsequently crushing more of the seeds that do form to grow further. This will result in a small number of undersized balls being discharged, and correspondingly a small number of seeds being recycled. In the next pass of these seeds through the drum new seed formation will be less inhibited and the product will once again contain a large number of undersized green balls. In the normal operating region to obtain acceptable ball quality, surging is inevitable in the conventional balling circuit.

Surging in the balling drum results in cyclical variations in the number of green balls formed of satisfactory size. These variations must be contained to a small proportion of product throughput to enable satisfactory performance to be achieved in the subsequent stages of the pelletizing process.

We are aware of no practical and economic way which has yet been found to eliminate surging but various control methods have been proposed. These include variation in the binding additive addition and in the water spray addition in the balling drum. Each method has its own disadvantages.

According to the present invention there is provided a method of reducing surging in a continuous balling process in which raw materials for ball formation are charged to a balling operation, formed balls are discharged from the balling operation and undersize balls of those discharged are recharged to the balling operation, which method comprises including in the process a stage modifying the fundamental direct relationship between discharged undersize balls and those recharged to the balling operation to reduce surging.

Surging is reduced by reducing the system gain.

The fundamental direct relationship between discharged undersize balls and those recharged to the balling operation is the recurrence of the former identically as the latter after a constant time interval.

This fundamental direct relationship can be modified to reduce surging in three basic ways, or in combinations thereof. The first such way is to vary the time spent by the balls between discharge and recharge, which would normally be constant. The second such basic way is to vary the normally constant mass relationship between the discharged and recharged balls. The third basic way is to vary the normally constant relationship between the size distribution in the undersize balls which are discharged and those which are recharged.

One way of carrying out the invention is to introduce a reservoir for the undersize balls in the return circuit. The reservoir is fed with balls at a varying rate, normally corresponding with the discharge rate of undersize balls, but balls are removed from it at a more constant rate. Over a long period of time the average rate of feeding the reservoir should equal the average rate of removal from the reservoir if the content of the reservoir is not to increase or diminish excessively.

A second way of carrying out the invention in a balling process which utilises more than one balling machine is by a transfer of balls from one return circuit to another.

Another approach is to extract from the return circuit altogether larger or smaller undersize balls as the circumstances demand, or a proportion of the undersize balls irrespective of their size. These can be recycled, crushed, to the raw material state of the process.

A further way of carrying out the invention comprises introducing in the return circuit separate reservoirs for different sizes of undersize balls and treating each reservoir as described above.

In multiple balling circuits an alternative is to exchange undersize balls of different sizes between circuits.

The invention is illustrated by way of example in the accompanying drawings which show diagrammatically in FIGS. 1 to 5 five balling processes in which surging is controlled.

BRIEF DESCRIPTION OF THE DRAWINGS

In FIG. 1 a souce 11 of raw material for the balling process steadily supplies a concentrate of ground iron ore, water and binding medium to a balling drum 12. Green balls are formed in the balling drum. At the discharge end of the drum is a screen 13 at which correctly sized and oversize green balls are directed towards a grate 14 from which they continue in the pelletizing process, with the possibility that oversize balls are instead crushed and recycled. Undersize green balls are separated at the screen 13 and conveyed back to a device 15 from which they are fed at a controlled rate back to the charge end of the balling drum together with fresh concentrate from the source 11.

Figure 1:
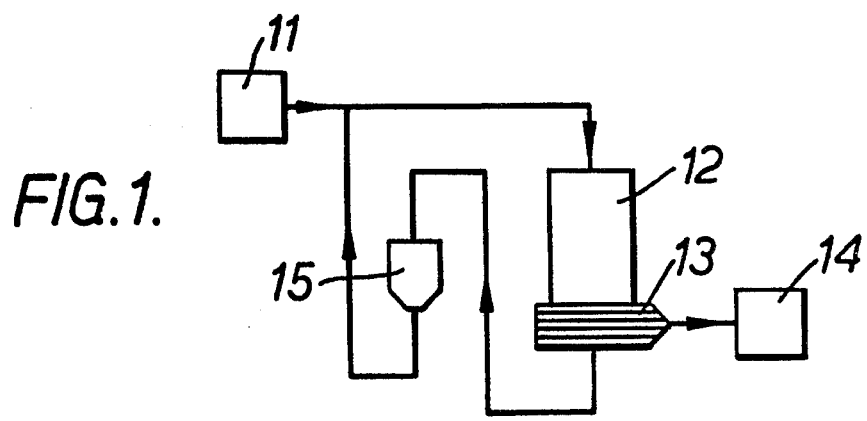
FIG. 1 illustrates a balling method with means provided for separating undersized balls and returning them to a controlled rate.
Figure 2:
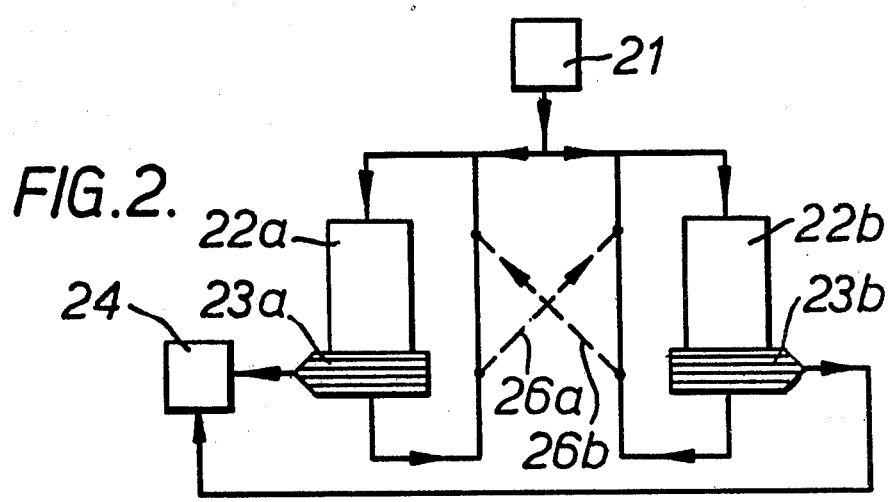
FIG. 2 illustrates a method using two balling drums in which separated balls from the product of one drum may be charged to the other drum.

In the process illustrated in FIG. 2 a source 21 of concentrate supplies two balling drums 22a and 22b, having at their discharge ends screens 23a and 23b feeding correctly sized and oversize green balls to grate 24.

The undersize balls are normally returned to the charge ends of the drums in which they were formed but cross-conveyors 26a and 26b are provided whereby some or all of the undersize green balls from drum 22a and/or 22b can for a period of time be switched to the charge end of the other drum 22b and/or 22a respectively.

Although only two balling circuits are shown for the sake of simplicity, in practice five or six might be interconnected in a similar manner.

Figure 3:
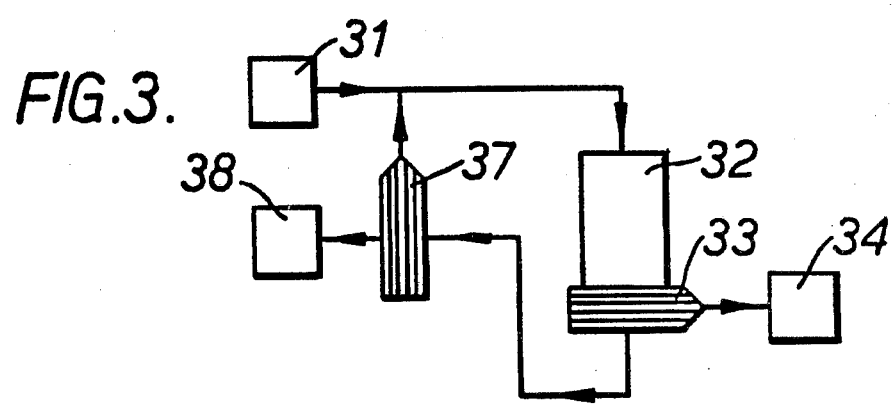
FIG. 3 illustrates a method wherein both oversized and undersized balls are separated.

In FIG. 3 a source of concentrate 31 supplies the charge end of one balling drum 32 which is provided with a screen 33 at its discharge end to feed correctly sized and oversize green balls to a grate 34. The undersize green balls separated at the screen pass to a further screen 37 in the return circuit. This screen 37 is selected, and can be changed, to remove from the return circuit balls either greater or smaller than a chosen size. These balls are conveyed to a crusher 38 from which they are recycled and their material in due course recurs in the feed concentrate. The remaining balls are returned to the charge end of the balling drum as in the previous examples.

It is possible to replace the screen 37 with a simple sampling device to extract random green balls from the return circuit at a controllable rate, the extracted balls likewise being crushed before being recycled.

Figure 4:
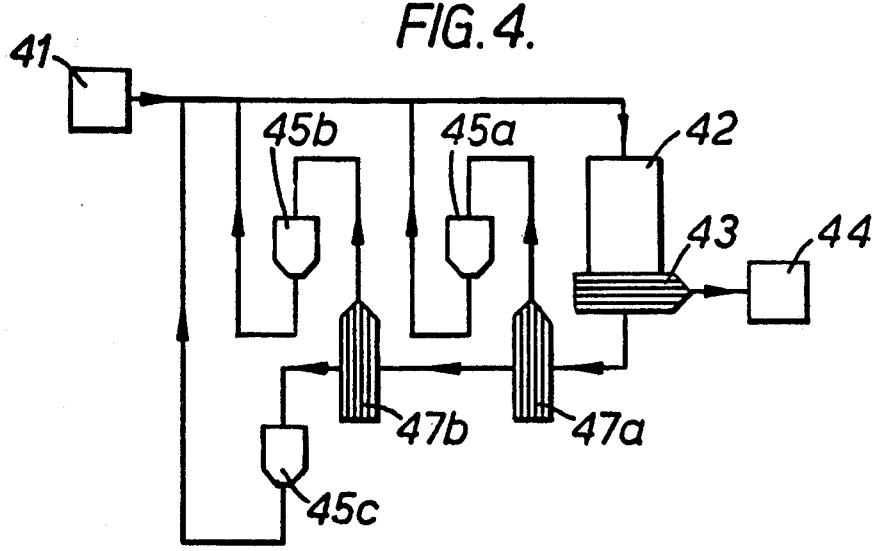
FIG. 4 illustrates a method in which the separated undersized balls are classified into separate hoppers.

In FIG. 4 a source 41 feeds concentrate to a single balling drum 42 provided with a discharge screen 43 feeding a grate 44 as before. The undersize green balls from the screen 43 are conveyed to another screen 47a at which the largest balls are taken out and passed to a surge hopper 45a. The remaining balls pass through the screen 47a to a further screen 47b at which the larger balls are taken out and passed to a second surge hopper 45b. The smaller balls pass through the screen 47b to a third surge hopper 45c. The three sizes of undersize green balls in the three surge hoppers 45a, 45b and 45c are thence conveyed each at a constant rate to be recharged into the balling drum 42.

Figure 5:
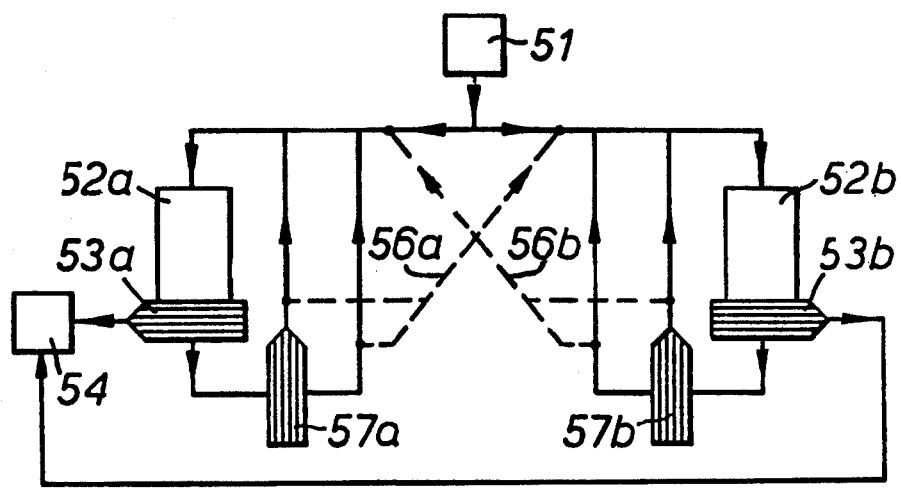
FIG. 5 illustrates a method similar to that of FIG. 2 except that the undersized balls are further screened.

In FIG. 5 a source 51 feeds concentrate to two balling circuits which respectively have balling drums 52a and 52b and discharge screens 53a and 53b feeding grate 54 in a similar manner to the balling circuits previously described. The undersize green balls from the screens 53a and 53b go to further screens 57a and 57b to be separated into larger and smaller balls. These are normally returned to the charge ends of the drums in which they were formed but cross-conveyors 56a and 56b are provided whereby some or all of the smaller or the larger green balls from balling drum 52a and/or 52b can for a period of time be switched to the charge end of the other drum.

As in the case of the system illustrated in FIG. 2, more than two balling circuits may well be interconnected in a similar manner.

It will be appreciated that other control methods and combinations of control methods will be possible to modify the fundamental direct relationship between discharged undersize balls and those recharged to the balling operation to reduce surging.

In the above examples reference is made to passing oversize green balls to the grate. This may be a tolerable practice when, as is often the case, such balls form only about five percent of the product.

We claim:

1. In a continuous process for balling particulate material comprising the steps of:
   (a) improving the adhesion properties of said particulate material;
   (b) balling said particulate material of step (a) in a balling device to produce green balls;
   (c) discharging said balls from said balling device;
   (d) separating balls having a size other than a predetermined size from balls having said predetermined size in the discharge of said balling device; and,
   (e) returning material, which is discharged from said balling device in the form of balls having sizes other than said predetermined size, to said balling device for balling with added particulate material; the improvement comprising:
   reducing surging in said balling process by modifying the fundamental direct relationship between discharged undersized balls and those recharged to the balling operation to reduce system gain.

2. A method as claimed in claim 1 wherein the balling process is a process for the production of green balls from iron ore, water and a binding additive.

3. In a continuous process for balling particulate material comprising the steps of:
   (a) improving the adhesion properties of said particulate material;
   (b) balling said particulate material of step (a) in a balling device to produce green balls;
   (c) discharging said balls from said balling device;
   (d) separating balls having a size other than a predetermined size from balls having said predetermined size in the discharge of said balling device; and
   (e) returning material, which is discharged from said balling device in the form of balls having sizes other than said predetermined size, to said balling device for balling with added particulate material; the improvement comprising:

modifying the fundamental direct relationship between discharged undersized balls and those recharged to the balling operation by varying the normally constant time spent by the undersized balls between discharge from the balling device and recharge to the balling device to reduce system gain.

4. A method as claimed in claim 3 wherein the fundamental direct relatioship is modified by feeding discharged undersize balls to a reservoir and recharging undersize balls to the balling operation from the reservoir at a more constant rate than they are discharged.

5. A method as claimed in claim 4 wherein discharged undersize balls of different sizes are fed to separate reservoirs and undersize balls are recharged to the balling operation from each reservoir at a more constant rate than they are fed to that reservoir.

6. A method as claimed in claim 4 wherein the average rate of feeding the balls to the reservoir is equal to the average rate of removing the balls from the reservoir.

7. In a continuous process for balling particulate material comprising the steps of:
  (a) improving the adhesion properties of said particulate material;
  (b) balling said particulate material of step (a) in a balling device to produce green balls;
  (c) discharging said balls from said balling device;
  (d) separating balls having a size other than a predetermined size from balls having said predetermined size in the discharge of said balling device; and
  (e) returning material, which is discharged from said balling device in the form of balls having sizes other than said predetermined size, to said balling device for balling with added particulate material; the improvement comprising:

modifying the fundamental direct relationship between discharged undersized balls and those recharged to the balling operation by varying the normally constant mass relationship between the discharged and recharged balls to reduce system gain.

8. A method as claimed in claim 7 wherein the fundamental direct relationship is modified by transferring undersize balls discharged from one balling operation to be recharged to another balling operation.

9. A method as claimed in claim 8 wherein undersize balls discharged from one balling operation are exchanged with undersize balls of different sizes discharged from another balling operation before being recharged to the balling operations.

10. A method as claimed in claim 7 wherein the fundamental direct relationship is modified by extracting from the balling process altogether larger or smaller discharged undersize balls, or a proportion of the discharged undersize balls irrespective of their size.

11. In a continuous process for balling particulate material comprising the steps of:
  (a) improving the adhesion properties of said particulate material;
  (b) balling said particulate material of step (a) in a balling device to produce green balls;
  (c) discharging said balls from said balling device;
  (d) separating balls having a size other than a predetermined size from balls having said predetermined size in the discharge of said balling device; and
  (e) returning material, which is discharged from said balling device in the form of balls having sizes other than said predetermined size, to said balling device for balling with added particulate material; the improvement comprising:

modifying the fundamental direct relationship between discharged undersized balls and those recharged to the balling operation by varying the normally constant relationship between the size distribution in the undersized balls which are discharged and those which are recharged to reduce system gain.

* * * * *